(12) United States Patent
McGarvey et al.

(10) Patent No.: US 10,264,808 B2
(45) Date of Patent: Apr. 23, 2019

(54) USE OF PHYLLOSPHERE ASSOCIATED LACTIC ACID BACTERIA AS BIOCONTROL AGENTS TO REDUCE BACTERIAL GROWTH ON FRESH PRODUCE

(71) Applicant: The United States of America, as represented by the Secretary of Agriculture, Washington, DC (US)

(72) Inventors: Jeffery A. McGarvey, San Francisco, CA (US); Robert M. Hnasko, Pinole, CA (US); Larry H. Stanker, Livermore, CA (US); Lisa A. Gorski, San Leandro, CA (US)

(73) Assignee: The United States of America, as Represented by the Secretary of Agriculture, Washington, DC (US)

( * ) Notice: Subject to any disclaimer, the term of this patent is extended or adjusted under 35 U.S.C. 154(b) by 142 days.

(21) Appl. No.: 15/377,186

(22) Filed: Dec. 13, 2016

(65) Prior Publication Data
US 2017/0181456 A1    Jun. 29, 2017

Related U.S. Application Data

(60) Provisional application No. 62/272,228, filed on Dec. 29, 2015.

(51) Int. Cl.
| | | |
|---|---|---|
| *A23B 7/154* | (2006.01) | |
| *A23L 3/3463* | (2006.01) | |
| *A23L 3/3571* | (2006.01) | |
| *A23B 7/155* | (2006.01) | |

(52) U.S. Cl.
CPC .......... *A23L 3/3463* (2013.01); *A23B 7/154* (2013.01); *A23B 7/155* (2013.01); *A23L 3/3571* (2013.01); *A23V 2002/00* (2013.01)

(58) Field of Classification Search
CPC .... A23V 2002/00; A23B 7/154; A23B 7/155; A23L 3/3463; A23L 3/3571
See application file for complete search history.

(56) References Cited

U.S. PATENT DOCUMENTS

| | | |
|---|---|---|
| 2005/0053702 A1 | 10/2005 | Elsser |
| 2005/0266128 A1 | 12/2005 | Yuan et al. |
| 2011/0195152 A1 | 8/2011 | Ware et al. |
| 2014/0322168 A1 | 10/2014 | Brown et al. |

FOREIGN PATENT DOCUMENTS

| | | |
|---|---|---|
| EP | 2338331 A1 | 6/2011 |
| EP | 2647694 A2 | 10/2013 |
| WO | 9403195 A1 | 2/1994 |
| WO | 9934679 | 7/1999 |

OTHER PUBLICATIONS

International Search Report, PCT/US2016/067799, The United States of America, as Represented by the Secretary of Agriculture dated Dec. 20, 2016.
Alegre, Isabel et al., An Enterobacteriaceae species isolated from apples controls foodborne pathogens on fresh-cut apples and peaches, Postharvest Biology and Technology, (2012), 74:118-124.
Andrews, John, Biological Control in the Phyllosphere, Annu. Rev. Phytopathol, (1992), 30:603-635.

*Primary Examiner* — Padmavathi Baskar
(74) *Attorney, Agent, or Firm* — John Fado; Maria Restrepo-Hartwig (57) ABSTRACT

The present invention relates to the use of phyllosphere-associated lactic acid bacteria that demonstrate inhibitory effects on the growth and maintenance of human pathogens, such as *Salmonella enterica*, on the surface of food products, particularly fresh fruits and vegetables. Particular strains of *Enterococcus avium* and *Lactococcus lactis* are described and detailed for their atypical pathogen-inhibiting phenotypes.

13 Claims, 4 Drawing Sheets

USE OF PHYLLOSPHERE ASSOCIATED LACTIC ACID BACTERIA AS BIOCONTROL AGENTS TO REDUCE BACTERIAL GROWTH ON FRESH PRODUCE

CROSS-REFERENCE

The present application claims priority to U.S. Provisional Patent Application Ser. No. 62/272,228, filed Dec. 29, 2015, the content of which is expressly incorporated herein by reference.

FIELD OF THE INVENTION

The disclosure relates to phyllosphere-associated lactic acid bacteria which are useful for reducing the growth of *Salmonella* species on fresh produce. Treatment of produce can take place either pre- or post-harvest and generally involves the application of bacterial species not normally present on the target fruit or vegetable.

BACKGROUND OF THE INVENTION

Foodborne illness remains a public health problem in the United States despite substantial efforts to ensure the integrity and wholesomeness of the food supply by the food industry and multiple governmental agencies. The Centers for Disease Control and Prevention estimate that there are approximately 48 million cases of foodborne illness in the United States each year, resulting in over 125,000 hospitalizations and 3,000 deaths (Scallan et al., Emerg. Infect. Dis. (2011) 17:7-15). It has been estimated that each case of foodborne illness has an economic impact of $1,068, which equates to an overall economic burden of over $50 billion annually (Scharff, J. Food Prot., (2012) 75:123-31). The number one cause of bacterial foodborne illness in the United States is non-thyphoidal *Salmonella*, which causes over 1 million illnesses a year; resulting in over 19 thousand hospitalizations and 380 deaths (Scallan et al, supra).

In the 1970s outbreaks of foodborne illness associated with produce were rare and accounted for approximately 1% of the total cases. However, by the 1990s the frequency of cases associated with produce increased to 12% (Sivapalasingam et al., J. Food Prot. (2004) 67:2342-53) and by 2003 that number increased to 30% (De Jong, A., Workshop towards Microbiol. Safety of Vegetables, Oct. 29, 2007, Marijkeweg 20, Wageningen). Produce can become contaminated with pathogenic bacteria at any point from planting to consumption, but is often thought of in terms of pre- and post-harvest contamination. Pre-harvest contamination occurs from the time the seed is planted until the crop is harvested and post-harvest contamination occurs during processing, shipping, and storage. Pre-harvest sources of contamination include soil, irrigation water, wild animals (rodents, birds, insects, etc.), improperly composted manure fertilizers, human harvesters, etc. Post-harvest sources include harvesting equipment and personnel, wash and cooling waters, shipping containers, processing equipment and personnel, etc. (Beuchat, L. R., Microbes and Infect., (2002) 4:413-23).

Because of the increasing frequency of foodborne illness associated with fresh produce and the many sources of contamination what is needed in the art are methods to eliminate human pathogenic bacteria from colonizing produce both pre- and post-harvest.

Fortunately, as will be clear from the following disclosure, the present invention provides for these and other needs.

SUMMARY OF THE INVENTION

One embodiment of the present invention is a method for controlling a human pathogen on the surface of a food product comprising the steps of applying a phyllosphere-associate lactic acid bacterium (PLAB) composition to the surface of the food product, where the PLAB composition comprises a biologically pure bacterium selected from the group consisting of *Lactococcus lactis* PTA-122478, *Enterococcus avium* PTA-122479, and a combination thereof, growing or storing the food product under conditions supporting the maintenance or growth of the PLAB organism(s), thereby controlling the human pathogen on the surface of the food product. In some instances, the PLAB organism is applied at a concentration of $1 \times 10^4$ to $1 \times 10^8$ CFU per square inch of the surface of the food product. In a particular embodiment, the PLAB organism is applied at a concentration of $1 \times 10^5$ CFU per square inch of the surface of the food product. In some instances, the PLAB organism utilized for this method is *Lactococcus lactis* PTA-122478. In other instances, the PLAB organism utilized for this method is *Enterococcus avium* PTA-122479. In still other instances, a combination of these two PLAB organisms is utilized. In some embodiments, the human pathogen controlled utilizing the present invention is *Salmonella enterica*, *Listeria monocytogenes*, or *Escherichia coli*. In a specific embodiment, the human pathogen is *Salmonella enterica* and its growth is reduced by at least about 10% compared to untreated food products.

In some instances, practicing this invention comprises dipping a food product into a carrier/PLAB organism mix after the food product is harvested. A PLAB organism can be present in the carrier at a concentration of $1 \times 10^8$ to $1 \times 10^9$ CFU per mL of the carrier. In some instances, practicing the methods disclosed herein involve applying a carrier/PLAB organism to a food product prior to harvesting the product, for example by aerial spraying or sprinkling.

Also provided herein are kits comprising a PLAB composition comprising a biologically pure bacterium selected from the group consisting of *Lactococcus lactis* PTA-122478, *Enterococcus avium* PTA-122479, and a combination thereof.

INCORPORATION BY REFERENCE

All publications, patents and patent applications mentioned in this specification are herein incorporated by reference to the same extent as if each individual publication, patent or patent application was specifically and individually indicated to be incorporated by reference.

BRIEF DESCRIPTION OF THE DRAWINGS

FIG. 3. Typically, producers keep cantaloupes under refrigeration temperatures during storage. Thus, the ability of the isolates to persist on the surfaces of the melons at 4° C. was tested and is shown in FIG. 3. SSPLAB 3H9 and 14B4 were inoculated onto the surfaces of melons by placing them in a sterile plastic bag and pouring 400 ml of a 16 hr culture onto them. Air from the bags was removed so that the culture was in constant contact with the melons and incubated for one hour at 25° C. The melons were then patted dry with paper towels, air dried for 16 hr and a 5×5 cm sections were removed and quantified for the isolates. As can be seen in FIG. 3, both isolates reached >1×10$^6$ CFU on the 5×5 cm sections on day 0 and persisted above 1×10$^6$ throughout the 9 day experiment FIG. 4. Illustrates the ability of Salmonella-suppressive phyllosphere-associated lactic acid bacteria (SSPLAB) 3H9 and 14B4 to reduce the growth of Salmonella enterica on cantaloupe rinds. The SSPLAB were applied to the melons in sterile plastic bags. 5×5 cm sections of the rind were removed and placed in sterile petri plates. Each rind was inoculated with approximately 200 CFU of Salmonella enterica, incubated for 24 hr at 25° C. and quantified them for S. enterica. As shown in the Figure, on the control rinds S. enterica reached over 2×10$^9$ CFU; while on the rinds treated with isolate 3H9 S. enterica only reached 2.2×10$^6$ CFU and on the rinds treated with 14B4 S. enterica only reached 1.3×10$^6$ CFU, representing approximately 1,000 and 1,700-fold reduction in growth, respectively.

DETAILED DESCRIPTION OF THE INVENTION

Preferred embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby.

As used in the specification and claims, use of the singular "a", "an", and "the" include plural references unless the context clearly dictates otherwise.

The terms "isolated", "purified", or "biologically pure" as used herein, refer to material that is substantially or essentially free from components that normally accompany the referenced material in its native state.

The term "about" is defined as plus or minus ten percent of a recited value. For example, about 1.0 g means 0.9 g to 1.1 g.

The term "phyllosphere" is used herein according to its customary meaning in the art. Thus, the term "phyllosphere", refers to the total above-ground portions of plants as habitat for microorganisms. The "phyllosphere" of plants may be colonized by a variety of bacteria, yeasts, and fungi. Because these colonizing microorganisms occur in the phyllosphere, they are referred to herein as "phyllosphere-associated". Exemplary "phyllosphere-associated" bacteria include e.g., lactic acid bacteria which are referred to herein as "phyllosphere-associated lactic acid bacteria" or "PLAB".

The term "Salmonella-suppressive bacteria" as used herein, refers to PLAB or other bacteria that, when applied in an inhibitory amount, to the surface of produce is effective for controlling Salmonella enterica.

As used herein, the term "control" or "controlling" as in e.g., the phrase: the "controls bacterial growth", refers to reducing the growth rate of the referenced organism, preventing infection or infestation by the referenced organism, or reducing the absolute numbers of the referenced organism present on target food products.

The expression "reducing the growth rate of" a particular bacterial organism or "reduce the growth rate of" a particular bacterial organism, or any grammatically equivalent expression as used herein refers to the difference in the growth rate of the referenced organism grown in the absence of PLAB as compared to the growth rate of referenced organism grown in the presence of PLAB. Typically, the growth rate of referenced organism is reduced when the difference in the growth rate of referenced organism grown in the absence of PLAB as compared to the growth rate of referenced organism grown in the presence of PLAB is at least about 10%. In some exemplary embodiments the difference in growth rate is reduced at least about 15%. In other exemplary embodiments the growth rate is reduced at least about 20%, about 30%, about 40%, about 50%, about 60% about 70%, about 80%, about 90%, or higher.

The expression "inhibitory amount" as used herein refers to the amount or titer of phyllosphere-associated lactic acid bacteria that, when present on the surface of fresh produce e.g., cantaloupe, broccoli, lettuce, etc. is effective for inhibiting the growth of a targeted microbe, for example, S. enterica, and thereby providing for control of the referenced microbe on fresh produce.

The expression "fresh produce" as used herein refers generally to farm-produced fruits and vegetable crops including, but not limited to fruit and vegetable crops such as e.g., corn, bean, and cilantro, cabbage, almonds, cucumbers, cantaloupes, etc.

"Food produce", "fresh produce" and other similar terms refer to fruits or vegetables or parts thereof that is, or can be infected or contaminated by pre-harvest pathogens, post-harvest pathogens and foodborne pathogens. The these terms encompass "exposed fresh fruit" and "exposed fresh vegetable" which includes tissues normally covered by the skin of the fruit or vegetable which is exposed when the fruit or vegetable is peeled, cut, segmented or otherwise revealed. The tissue can be fresh or raw and is preferably in the form of cut or segmented pieces which have not been heat sterilized or blanched. Generally, one or more of any type of fresh vegetable, fruit or nut, for example, may be treated with the present invention. Suitable examples of fruit include apples, apricots, avocado, bananas, blackberries, blueberries, cantaloupes, cherries, cranberries, custard apples, dates, durian, figs, grapefruit, grapes, jack fruit, kiwi fruit, lemons, limes, lychee, mandarins, mangosteen, mangoes, melons, nashi, nectarines, oranges, papaya or paw paw, passionfruit, peaches, pears, pineapple, plums, pomegranates, pomelo, raspberries, rhubarb, star fruit, strawberries, tamarillo, and tangerines of any maturity. Any edible nut, such as almonds, pecans and walnuts, is also included. Suitable non-limitative examples of vegetables include: potatoes, corn, tomatoes, onions, herbs, squash, beans, peppers, okra, turnips, broccoli, cauliflower, cabbage, carrots, brussels, sprouts, zucchini, radishes, celery, lettuce, and even prepared mixed vegetable salads. Moreover, any fresh vegetable, fruit or nut may be treated with the present invention, whether grown in the ground or grown hydroponically. One of skill in the art will recognize that the above listed fruits and vegetables are merely representative, and are not an exclusive list of such items that can be the subject of the present invention. The compositions and methods described herein can be utilized for any suitable crop.

As used herein, "foodborne pathogen" refers to a bacterium or a fungus capable of contaminating a fruit or a vegetable and causing disease to humans or animals ingesting the fruit or vegetable.

General Methods

This disclosure utilizes routine techniques in the field of microbiology and microbial genetics. Basic texts disclosing the general methods of use in this disclosure include e.g., *Methods for General and Molecular Microbiology*, 3rd ed., C. A. Reddy, et al., eds. ASM Press (2007); and *Encyclopedia of Microbiology*, 2nd ed., Joshua Lederburg, ed., Academic Press (2000).

Unless otherwise noted, technical terms are used according to conventional usage. Definitions of common terms in microbiology maybe found in e.g., *Microbiology* By Cliffs Notes, I. Edward Alcamo, Wiley (1996); *Encyclopedia of Microbiology*, (2000) supra; *Dictionary of Microbiology and Molecular Biology* 3rd ed., Paul Singleton and Diana Sainsbury, Wiley (2007).

This disclosure also utilizes routine techniques in the field of recombinant genetics. Basic texts disclosing the general methods of use in this invention include Sambrook et al., Molecular Cloning—A Laboratory Manual (2nd Ed.), Vol. 1-3, Cold Spring Harbor Laboratory, Cold Spring Harbor, N.Y., 1989; Kriegler, Gene Transfer and Expression: A Laboratory Manual (1990); and Current Protocols in Molecular Biology (Ausubel et al., eds., 1994)). Unless otherwise noted, technical terms are used according to conventional usage. Definitions of common terms in molecular biology maybe found in e.g., Benjamin Lewin, Genes V, published by Oxford University Press, 1994 (ISBN 0-19-854287-9); Kendrew et al. (eds.), The Encyclopedia of Molecular Biology, published by Blackwell Science Ltd., 1994 (ISBN 0-632-02182-9); and Robert A. Meyers (ed.), Molecular Biology and Biotechnology: a Comprehensive Desk Reference, published by VCH Publishers, Inc., 1995 (ISBN 1-56081-569-8).

In some embodiments, the present invention provides for compositions comprising PLAB bacteria that inhibit the growth of undesirable microorganisms, such as foodborne pathogens, including, but not limited to *Salmonella enterica*. Such PLAB bacteria are typically grown in culture and added to a vehicle that allows for application to a food product pre-harvest, post-harvest, and/or post-processing.

PLAB-containing compositions disclosed herein can be used to treat food products pre-harvest, post-harvest, or post-packaging. In some instances, PLAB bacteria are applied using a spray solution, a dip solution, or a wash solution. Such solutions can comprise $0.5 \times 10^1$, $1 \times 10^1$, $1.5 \times 10^1$, $1 \times 10^2$, $1.5 \times 10^2$, $1 \times 10^3$, $1.5 \times 10^3$, $1 \times 10^4$, $1.5 \times 10^4$, $1 \times 10^5$, $1.5 \times 10^5$, $1 \times 10^6$, $1.5 \times 10^6$, $1 \times 10^7$, $1.5 \times 10^7$, $1 \times 10^8$, $1.5 \times 10^8$, $1 \times 10^9$, $1.5 \times 10^9$, $1 \times 10^{10}$, $1.5 \times 10^{10}$, $1 \times 10^{11}$, $1.5 \times 10^{11}$, $1 \times 10^{12}$, $1.5 \times 10^{12}$ or more PLAB CFU per mL. Such compositions can contain more than one species of PLAB, for example 2, 3, 4, 5, 6, 7, 8, 9, 10, or more species. In one particular embodiment, a spray, dip or wash solution comprises biologically pure strains of bacteria deposited as ATCC accession No. PTA-122479 ("3H9"), ATCC accession No. PTA-122478 ("14B4"), or a combination of the two. In embodiments where more than one PLAB organism is included in a PLAB-containing composition, the individual species can be present at any of the concentrations mentioned herein. Regardless of the manner in which a PLAB composition of the present invention is applied to a food product, an individual PLAB organism can be present on a treated food product at a concentration of $0.5 \times 10^1$, $1 \times 10^1$, $1.5 \times 10^1$, $1 \times 10^2$, $1.5 \times 10^2$, $1 \times 10^3$, $1.5 \times 10^3$, $1 \times 10^4$, $1.5 \times 10^4$, $1 \times 10^5$, $1.5 \times 10^5$, $1 \times 10^6$, $1.5 \times 10^6$, $1 \times 10^7$, $1.5 \times 10^7$, $1 \times 10^8$, $1.5 \times 10^8$, $1 \times 10^9$, $1.5 \times 10^9$, $1 \times 10^{10}$, $1.5 \times 10^{10}$, $1 \times 10^{11}$, $1.5 \times 10^{11}$, $1 \times 10^{12}$, $1.5 \times 10^{12}$ or more PLAB bacteria per square inch or per $cm^2$.

In food safety and some other applications involving treatment of microorganisms, sanitizing is important. As used herein, sanitizing means controlling the growth and reproduction of microbial contaminants or pathogens to safe levels as judged by public health requirements. In one embodiment, this is at least a 1 log reduction in pathogenic bacterial cell number, in another embodiment at least a 2 log reduction, in another at least a 3 log reduction, in another at least a 4 log reduction, and in another at least a 5 log reduction.

In some instances, the PLAB-containing compositions and methods of using them disclosed herein are used to control an organism that is a human pathogen. Exemplary human pathogens include, but are not limited to *Clostridium* spp., *Corynebacterium* spp. *Enterobacter* spp., *E. coli*, *Klebsiella* spp., *Legionella* spp., *Listeria* spp., *Salmonella* spp. (*Salmonella enterica*), *Shigella* spp., *Staphylococcus* spp., *Streptococcus* spp., *Aspergillus* spp., and *Penicillium* spp.

As described herein, PLAB organisms can be utilized to control human pathogens. In a particular embodiment, a PLAB organism utilized is one termed "3H9" (ATCC Accession No. PTA-122479), which is >99% identical to *Enterococcus avium* (GenBank accession number NR_113899). Isolate 3H9 is a Gram type positive, ovoid cell shaped bacterium that grows in pairs or short chains. Colonies on triptic soy agar are non-pigmented, circular, smooth and entire. The isolate grows under both aerobic and anaerobic conditions, is arginine dihydrolase positive and produces acid from ribose, mannose, sorbitol, lactose and trehalose. In another particular embodiment, a PLAB organism utilized is one termed "14B4" (ATCC Accession No. PTA-122478), which is >99% identical to *Lactococcus lactis* (GenBank accession number NR_113958). Isolate 14B4 is a Gram type negative bacterium with ovoid cells occurring mostly in pairs or chains. The isolate is able to grow under both aerobic and anaerobic conditions. Colonies on triptic soy agar are non-pigmented, circular, smooth and entire. The isolate is able to grow in triptic soy broth with 6% sodium chloride and produces acid from ribose, mannose and trehalose. Both isolates demonstrate the ability to control the growth of the human pathogen, *S. enterica*, unlike many other naturally-isolated strains of *L. lactis* and *E. avium*.

Microbial Culture Conditions

In some embodiments of the present invention, it is preferred to prepare and grow cultures of representative PLAB organisms (such as *Lactococcus lactis* and *Enterococcus avium*) prior to preparing PLAB-containing compositions for application to food products. PLAB organisms can be grown on or in any standard medium known in the art. One of skill in the art will recognize that multiple culture conditions can be utilized and modified in practicing the invention disclosed herein. Non-limiting examples of culture conditions that can be modified during the application and practice of the inventions disclosed herein, include: 1) temperature; 2) primary carbon source; 3) oxygen concentration; 4) primary nitrogen source; 5) pH; 6) mineral and other ion concentration; 7) age/growth phase of culture; 8) organization of an industrial fermenter; and 9) predominant morphological form. One of skill in the art will recognize that other culture parameters affecting desired bioproduct production and bioproduct yield can be modified.

In one aspect of the invention, cultures of PLAB strains described herein can be grown at any temperature that facilitates the production of one or more bioproducts. For example, a culture can be grown at a temperature of 15°–30° C., or any whole or partial degree within that range, including, but not limited to 15.0° C., 15.5° C., 16.0° C., 16.5° C., 17.0° C., 17.5° C., 18.0° C., 18.5° C., 19.0° C., 19.5° C., 20.0° C., 20.5° C., 21.0° C., 21.5° C., 22.0° C., 22.5° C., 23.0° C., 23.5° C., 24.0° C., 24.5° C., 25.0° C., 25.5° C., 26.0° C., 26.5° C., 27.0° C., 27.5° C., 28.0° C., 28.5° C., 29.0° C., 29.5° C., and 30.0° C.

In some embodiments, the microbial strains described herein can be grown under conditions where the pH of the culture facilitates the production of one or more bioproducts of interest. For example, a culture can be grown in media where the pH is between 5.5 and 8.5, 6.0 and 7.5, or any value within that range, including, but not limited to pH 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5. One of skill in the art will recognize that a stable pH does not need to be maintained throughout the entirety of the growth of the strain producing the bioproduct(s) of interest. Thus, in some embodiments, the pH of a microbial culture of the present invention will vary. In other embodiments, pH buffers can be added to maintain a relatively stable pH where the pH of the culture medium over the life of the culture does not vary from a chosen starting point by more than ±0.5.

In some embodiments, microbial strains of the present invention can be grown in the presence of particular carbon sources. For example, a culture can be grown in the presence of simple carbon sources such as (D- or L-) arabitol, sucrose, fructose, glucose, mannose, galactose, arabinose, arabinose, xylose, mannitol, glucitol, galactitol, xylitol, ribitol, threitol, glycerol, gluconic acid, glucosamine, or meso-erythritol. Alternately, a culture can be grown in the presence of complex carbon sources such as cellulose, starch, beet molasses, carob pod, cornmeal hydrolysates, corn syrup, fuel ethanol fermentation stillage, grape skin pulp, vegetable oils, peat hydrolysate, hydrolyzed potato starch, and spent sulfite liquor. Carbon sources that are also sources for other nutritional requirements, such as nitrogen, can be utilized. For example, media for use in the present invention can include amino acids such as aspartate, threonine, lysine, methionine, isoleucine, asparagine, glutamic acid, glutamine, proline, alanine, valine, leucine, tryptophan, tyrosine, phenylalanine and their metabolic intermediates. These lists are non-limiting and it is well within the capabilities of one of skill in the art to utilize other carbon sources in practicing the present invention. Any carbon source can be used alone or in combination with other carbon sources.

Other nutritional parameters can also be varied, including nitrogen sources. Non-limiting examples of nitrogen sources include organic nitrogen sources (e.g., peptone, soybean pomace, yeast extract, food gravy, malt extract, corn steep liquor and soybean flour) and inorganic nitrogen sources (e.g, urea, ammonium sulfate, ammonium chloride, ammonium phosphate, ammonium carbonate and ammonium nitrate) can be included in growth media utilized in the practice of the present invention. Phosphate sources such as potassium dihydrogen phosphate, dipotassium hydrogen phosphate and their corresponding sodium-containing salts can be included in growth media as necessary. Metal and mineral salts such as salts of zinc, iron, magnesium, manganese, calcium and copper can be included as needed. Other nutritional supplements, such as vitamins (e.g, biotin, thiamine) can also be included. One of skill in the art will recognize that varying culture nutritional makeup can be utilized to maximize production of a bioproduct of interest and decrease production of undesired by-products. Any of these nutrients can be used alone or in combination with any other nutrient.

Nutrients can be added to the culture in any feeding regimen, including, but not limited to high cell-density culture, batch culture, fed-batch culture, constantly-fed-batch culture, exponentially-fed batch culture, continuous culture, or a mixture of these approaches for different nutrients.

Additional Components of PLAB-Containing Compositions.

Effective concentrations of PLAB organisms to control the growth of target pathogens, such as *S. enterica*, can be applied to food products pre-harvest, post-harvest or post-processing by any methodology known in the art. The particular methodology is not important as long as it effectively delivers an effective concentration of the PLAB organisms to the target food product as described herein. Some exemplary application methodologies are provided, however, one of skill in the art will recognize that these are illustrative examples, and not exhaustive descriptions of the ways in which the present invention can be utilized.

In one embodiment of the invention, the number of undesired bacteria (e.g., *S. enterica*) or microorganisms on the produce is reduced by greater than about 1 log, 1.5 logs, 2 logs, 2.5 logs, 3 logs, 3.5 logs, 4 logs, 4.5 logs, or 5 logs (or any value between about 0.5 log and 5 logs) in the presence or absence of disinfectants. Advantageously, the PLAB-containing compositions and methods of the invention effectively and efficiently reduce the numbers of undesired microorganisms on food products without degradation of the appearance, taste, or other physiochemical properties of the food products over the whole shelf life of the produce.

Applications

Generally, the PLAB-containing compositions useful in practicing the present invention can contain solid or liquid vehicles for bacterial cells and, optionally, one or more additional agents. The vehicles and additional agents utilized are preferably ones that are acceptable in agriculture; inert and conventional vehicles and conventional surface-active agents can be used. The compositions are also preferably suitable for use in contact with human tissue without undue toxicity, incompatibility, instability, allergic response, and the like. These compositions cover not only compositions that are ready to be applied to the fruits and vegetables, as for example by means of a suitable device, such as a spray device, but also commercial concentrated compositions which have to be diluted before application to a fruit or vegetable.

In some embodiments, a PLAB-containing composition of the present invention comprises an inert ingredient. Preferably, the inert ingredient comprises a carrier such as water. The carrier is usually present at the highest percentage level of any of the ingredients present in a PLAB-containing composition useful in practicing the inventions disclosed herein. The carrier may be present in the form of a solid, a liquid or a gas; however, liquid and gaseous carriers are preferred. Preferred gaseous carriers include but are not limited to air, nitrogen, the inert gases (i.e., helium, neon, argon, krypton, xenon and radon) and mixtures thereof.

When a liquid carrier is selected, it may be aqueous, organic, inorganic, non-ionic, cationic, anionic, or a mixture, emulsion, or suspension or any combination thereof. Preferred liquid carriers include but are not limited to water, alcohols and oils used in the formulation of agricultural spray emulsions suitable for use on plants and/or crops, and mixtures thereof.

Inert ingredient (s) other than the carrier may also be present along with the molecular iodine and other optional additive (s). These inert ingredients include but are not limited to fertilizers, fertilizer components, nutrients, micronutrients, promoters (i.e., of molecular iodine activity, such as methyl paraben and propyl paraben), polyaspartates, surfactants, emulsifiers, oils, odorants, waxes, salts, preservatives and iodides. Additional inert ingredients, other than carriers, include but are not limited to promoters; plant nutrients, such as nitrogen, phosphorus, potassium, calcium, magnesium, sulfur, boron, chlorine, copper, iron, manganese, molybdenum and zinc, emulsifiers; surfactants, and mixtures thereof.

PLAB-containing compositions of the present invention can also contain any kind of other ingredients such as, for example, protective colloids, adhesives, binding agents, chelating agents, thickening agents, thixotropic agents, penetrating agents, stabilizing agents, sequestering agents and the like. The compositions used in the method of the present invention may also contain other additives depending on the intended use for the composition. For example, the compositions may contain anti-foam agents, antioxidants, natural or synthetic seasonings and/or flavors, dyes and/or colorants, vitamins, minerals, nutrients, enzymes, insecticides, deodorants, and mixtures thereof. The amount of such optional additives included in the composition of the present invention may vary by need of the application method, target food product, or any other parameter relevant to application of the composition.

In most embodiments, PLAB-containing compositions of the present invention are used to treat the surface of solid food products. The compositions can be applied to fruits, nuts and vegetables by dipping, spraying, painting, marinating, and/or wiping the surface, the key criteria being that the composition is available to the surface subject to contamination by a target pathogen. In still other embodiments, the composition may be indirectly placed into contact with the food surface by applying the composition to food packaging and thereafter applying the packaging to the food surface. The optimum amount to be used will depend on the composition of the particular food product to be treated and the method used for applying the composition to the food surface, but can be determined by simple experimentation.

In general, an effective amount of the PLAB-containing compositions of the present invention is applied to a fruit or vegetable surface harboring, or capable of harboring, a target pathogen. Application of the PLAB-containing compositions can include application to soil; seeds; minimally processed foods; unprocessed foods; pre-harvest foods; post-harvest foods; buildings, including storage facilities and greenhouses; other types of enclosed containers, including ship hulls, grain silos and boxes of fruits and vegetables; and any combination of these. In some embodiments of the invention, a PLAB-containing composition is applied multiple times from pre-planting to post-processing. The PLAB-containing compositions of the present invention can be used in any way desired by one of skill in the art and in any way pertinent to the application of the compositions, including, but not limited to, pre-harvest agricultural applications, post-harvest agricultural applications, and food safety applications.

In pre-harvest agricultural applications, the PLAB-containing compositions of the present invention are used in methods for treating or protecting fruit, seeds, plants or the soil surrounding the plants from an infestation by an undesired organism by applying to the organism or to a locus inhabited by the organism (such as the surface of a fruit or vegetable) an effective amount of the composition. In preferred embodiments, the undesired organism is a microorganism such as *Salmonella enterica*. In pre-harvest agricultural applications, an effective amount of a PLAB-containing composition is an amount effective to control the target microorganism(s).

For example, a method herein can comprise delivering a PLAB-containing composition to soil. Such application to soil can be prior to plowing, prior to sowing seeds, after planting, or any time prior to harvest. In an embodiment, the application of a composition herein penetrates into the soil. In other embodiments, application of PLAB-containing compositions of the present invention can follow treatment of soil to control soil-borne microbes, for example using steam.

PLAB-containing compositions of the invention disclosed herein can be applied to soil, fruits, vegetables, crops, and any other desired target using any delivery methodology known to those of skill in the art. For example, the compositions can be applied to the desired locale via methods and forms including, but not limited to, shank injection, sprays, granules, flood/furrow methods, sprinklers, fumigation and drip irrigation. In embodiments of the invention where PLAB-containing compositions are sprayed onto a desired locale the compositions can be delivered as a liquid suspension, emulsion, microemulsion or powder. In other embodiments, granules or microcapsules can be used to deliver the bacterial compositions of the invention.

If desired, PLAB-containing compositions of the invention can be used in combination with fumigants. For example, the compounds herein may be used together with inert gases (such as nitrogen, noble gases) and/or carbon dioxide. The inert gases and carbon dioxide can serve as auxiliary gases, for example as carrier gases in compounds with a higher boiling point. Other fumigants can also serve as carrier gases.

In some embodiments, the PLAB-containing compositions of the present invention can be used for seed treatment. Typically, seed treatment involves treating seeds in order to inhibit growth of target pathogens after planting, while seed sanitation generally involves treating seeds to inhibit the growth of seed-borne diseases before planting. In some instances, a delivery system for a composition herein for seed treatment comprises a dressing, a pellet, a seed coating, or any other system known in the art.

The compositions of the present invention can be applied by spraying, delivered with brushes or applied in an oil or wax carrier. The compositions can be applied in various ranges depending upon the agricultural substance to which the composition is applied, climate and time of year, among other factors. At least one portion of the plant, which may consist of fruits, vegetables or flowers, may be covered before applying the composition to prevent contact with the composition.

The plant and/or crop protectant compositions of the present invention may be applied by any convenient method, for example, by using a fixed application system such as a center pivot irrigation system. Preferably, application to 
fields of plants and/or crops is made by air spraying, i.e., from an airplane or helicopter, or by land spraying. For example, land spraying may be carried out by using a high flotation applicator equipped with a boom, by a back-pack sprayer or by nurse trucks or tanks. Optionally, application may be made to plants which have their fruit(s), vegetable (s) and/or flower (s) protected, e.g., by paper or plastic bags.

Deposit Information

A deposit of the phyllosphere-associated lactic acid bacterium 3H9, disclosed herein and recited in the appended claims has been made with the American Type Culture Collection (ATCC), Patent Depository, 10801 University Blvd., Manassas, Va. 20110, U.S.A. The date of deposit was Aug. 18, 2015. All restrictions upon the deposit have been removed, and the deposit is intended to meet all of the requirements of 37 C.F.R. 1.801-1.809. The ATCC accession number is PTA-122479. The material description is: phyllosphere-associated lactic acid bacterium 3H9. The deposit will be maintained in the depository for a period of 30 years, or 5 years after the last request, or for the effective life of the patent, whichever is longer, and will be replaced as necessary during that period.

A deposit of the phyllosphere-associated lactic acid bacterium 14B4, disclosed herein and recited in the appended claims has been made with the American Type Culture Collection (ATCC), Patent Depository, 10801 University Blvd., Manassas, Va. 20110, U.S.A. The date of deposit was Aug. 15, 2015. All restrictions upon the deposit have been removed, and the deposit is intended to meet all of the requirements of 37 C.F.R. 1.801-1.809. The ATCC accession number is PTA-122478. The material description is: phyllosphere-associated lactic acid bacterium 14B4. The deposit will be maintained in the depository for a period of 30 years, or 5 years after the last request, or for the effective life of the patent, whichever is longer, and will be replaced as necessary during that period.

The following examples are offered to illustrate, but not to limit the invention.

EXAMPLES

Isolation of *Salmonella*-Suppressive PLAB (SSPLAB) from Plants

To isolate PLAB capable of growing on the surfaces of plants, several different types of plant material including: cabbage, almonds, cucumbers, cantaloupes, and alfalfa were obtained. Fifty grams of each type of plant material was suspended in 300 ml of phosphate buffered saline with 0.01% tween 80 (PBS+T) and shaken at 300 RPM at 25° C. for 60 min. The plant material was removed and the supernatant was plated onto de Man, Rogosa, Sharp agar plates (Oxoid, Basingstoke, Hampshire, England) and incubated at 30° C. under anaerobic conditions for 48 hrs. Isolates were transferred to 96-well plates containing triptic soy broth (TSB) (Oxoid, Basingstoke, Hampshire, England) with 10% glycerol and stored at −80° C. until needed.

Identification of PLAB by Use of 16S rRNA Sequence Analysis.

SSPLAB were inoculated into 3 ml of TSB and incubated for 16 hrs at 30° C. Cultures were centrifuged at 8,000×g for 10 min and the pellet suspended in PBS. DNA was extracted using the Wizard Genomic DNA Purification Kit (Promega, Madison, Wis.) as per the manufacturer's instructions. The 16S rRNA gene was PCR amplified in 50 µl reactions containing 25 µl High Fidelity PCR Master Mix (Roche, Nutley, N.J.), 50 ng DNA and 1 mole 1-1 of the primers 27F and 1492R in a C1000/S1000 Touch Thermocycler (Bio-Rad, Hercules, Calif.) under the following conditions: one cycle of 95° C. for 5 min, 30 cycles of 94° C. for 30 s, 55° C. for 30 s, 72° C. for 1.5 min, and one cycle of 10 min at 72° C. The resulting DNA was cloned using the TOPO TA Cloning Kit (Invitrogen, Carlsbad, Calif.) as per the manufacturer's instructions and transformed into *E. coli* TOP10 competent cells (Invitrogen, Carlsbad, Calif.). Transformants were grown on LB agar plates containing 50 µg $ml^{-1}$ kanamycin (Km) and 80 µg $ml^{-1}$ 5-bromo-4-chloro-3-indolyl-β-D-galactopyranoside (X-gal). Individual colonies were picked and streaked onto LB Km agar plates. Plasmid minipreps were performed using the QIAprep Spin Miniprep Kit following the manufactures instructions. Plasmid inserts were sequenced using the M13F and M13R primers and the BigDye Terminator v3.1 Cycle Sequencing Kit (Applied Biosystems, Foster City, Calif.). Sequencing reactions were purified using the BigDye XTerminator Purification Kit (Applied Biosystems, Foster City, Calif.); electrophoresis and readout was performed using an Applied Biosystems 3730XL Genetic Analyzer (Applied Biosystems, Foster City, Calif.). The forward and reverse sequences were aligned using SeqManII software (DNASTAR Inc., Madison, Wis.). Sequences were edited by hand to remove plasmid sequence and analyzed using the BLAST software and the NCBI nr/nt database (available at http://blast.ncbi.nlm.nih.gov/).

In Vitro Inhibition of *Salmonella* Growth

Frozen stock cultures of SSPLAB in 96-well plates were thawed at room temperature and inoculated into fresh TSB in 96-well plates and incubated at 30° C. for 16 hrs without shaking (FIG. 1). *Salmonella* pGFP was inoculated into 3 ml TSB with kanamycin (50 mg ml-1) and also grown at 37° C. with shaking for 16 hrs, diluted to approximately $5\times10^5$ CFU $ml^{-1}$ in PBS, again diluted to approximately $5\times10^3$ CFU $ml^{-1}$ in TSB soft agar (TSB+0.06% agar) and 50 µl placed in each well of a 96-well plate. After the TSB soft agar had solidified, 50 µl of the PLAB cultures were place on top of the soft agar and the plates incubated at 25° C. for 24 hrs and analyzed for fluorescence in a Victor 3 Mulitilabel Counter (Perkin Elmer, Waltham Mass.). Wells with the least amount of fluorescence, and thus the least amount of *Salmonella* pGFT growth, were selected for further analysis.

Growth and Persistence of SSPLAB on the Surfaces of Cantaloupe Melons

Cultures of PLAB were grown for 16 hrs and diluted to approximately $1\times10^5$ CFU $ml^{-1}$ in PBS. Ten 10 µl drops were deposited onto the surface of cantaloupe melons and incubated at 25° C. The number of SSPLAB on the melons was quantified daily for 3 days to determine if the SSPLAB were able to grow and persist by removing a 5 $cm^2$ section of the rind where the SSPLAB were inoculated onto the melon. The sections were homogenized with an Osterizer Beehive blender (Oster, Neosho, Mo.) in 100 ml of PBS in a sterilized blender jar on high speed for 1 min. The resulting solutions were serially diluted in PBS and plated onto MRS plates, incubated at 30° C. under anaerobic conditions for 24 hrs and counted. SSPLAB were also assayed for the ability to persist at 4° C. using the same protocol except the melons were incubated at 4° C. and the SSPLAB were quantified every 3 days for 9 days.

Multiple experiments were performed to assess the growth of our SSPLAB on organically and conventionally grown cantaloupe melons purchased at different local grocery stores. In all of these experiments, un-inoculated cantaloupes were used as negative controls. In all of the experiments, none of the negative control melons exhibited growth of *Enterococcus* or *Lactococcus* species on de Man, Rogosa, Sharp agar plates, which are selective for the lactic acid bacteria. From these data it was concluded that the SSPLAB strains described here do not naturally inhabit cantaloupe melons.

Inhibition of *Salmonella* Growth on Cantaloupes Colonized by PLAB.

SSPLAB (strains 14B4 and 3H9) were inoculated into 400 ml of TSB and grown for 16 hr at 30° C. without shaking and reached a density of $1 \times 10^8$ to $1 \times 10^9$ cells per ml. The cultures were placed into sterile 3.8 liter plastic bags containing a cantaloupe melon. The air from the plastic bag was removed so that the culture was in constant contact with the cantaloupe and incubated at 25° C. for 1 hr. Control melons were treated the same way but 400 ml of PBS was place into the sterile bags. After an hour the melons were blotted dry with paper towels and air dried for 16 hrs at 25° C. Five $cm^2$ sections of the melon rinds were removed using a sterile scalpel and placed into a sterile 100×20 mm petri plates (Falcon, Corning, N.Y.). *Salmonella enterica* Poona strain RM3363, a cantaloupe outbreak isolate (Anonymous 2002. Multistate outbreaks of *Salmonella* serotype poona infections. MMWR 51:1044), was grown for 16 hrs at 37° C. shaking at 300 RPM, diluted to approximately $5 \times 10^3$ CFU $ml^{-1}$ in PBS and $10^{-1}$ ul drops were placed onto the cantaloupe rinds. The rinds were incubated at 25° C. for 16 hrs and quantified for *Salmonella* by homogenizing with an Osterizer Beehive blender (Oster, Neosho, Mo.) in 100 ml of PBS in a sterilized blender jar on high speed for 1 min. The resulting solution was serially diluted in PBS and plated onto Rappaport-Vassiliadis R10 agar plates (Difco, Sparks, Md.), incubated at 37° C. for 16 hrs and counted.

Results

Figure 1:
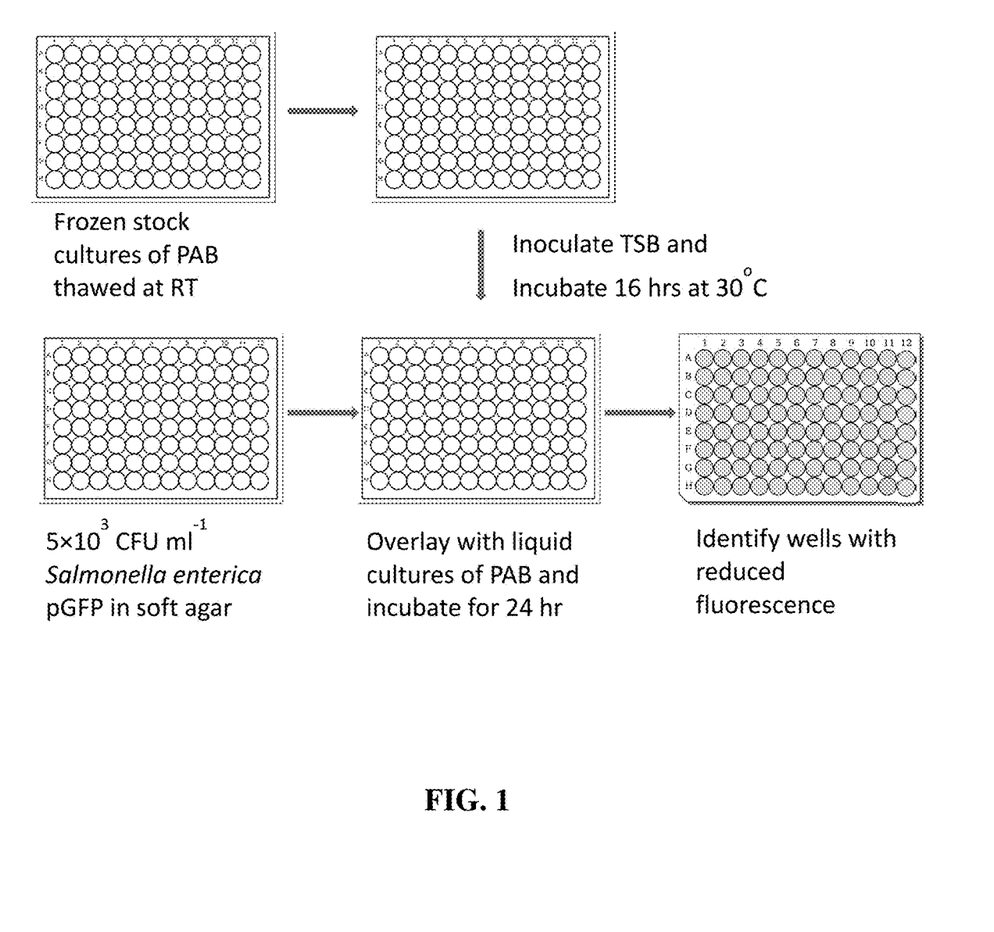
FIG. 1. Illustrates a method (disclosed hereinbelow) for the identification of phyllosphere-associated lactic acid bacteria that have the ability to inhibit the growth of *Salmonella enterica* pGFP in vitro.

Over 1,000 lactic acid bacteria were isolated from the phylosphere of various plants including: cabbage, almonds, cucumbers, cantaloupes, and alfalfa and examined them for the ability to inhibit the growth of *Salmonella enterica* pGFP in vitro (FIG. 1). In the high throughput assay illustrated in FIG. 1, we indirectly measured the growth of *Salmonella enterica* pGFP in soft agar overlaid with PLAB by measuring the amount of fluorescence after 24 hrs. If the PLAB overlay was able to inhibit the growth of *Salmonella enterica* pGFP, a decrease in the amount of fluorescence would be observed as compared to the PBS control. The vast majority of PLAB had no or very little affect on the growth, and thus the amount of fluorescence emitted by *Salmonella enterica* pGFP after 24 hrs. However, we did identify 2 PLAB, designated 3H9 and 14B4 that substantially inhibited the fluorescence of *Salmonella enterica* pGFP and therefore are *Salmonella*-suppressive. Further analysis of isolates 3H9 and 14B4 revealed that they were able to reduce the fluorescence of *S. enterica*, *Salmonella typhimurium*, *Listeria monocytogenes* and *Escherichia coli* O157:H7 pGFP by 38.4- and 47.2-fold, respectively (Table 1).

TABLE 1

In vitro pathogen growth inhibition as measured by fluorescence

| Isolate | Avg. RFU[2] (St. Dev.) | Fold Difference | P value |
|---|---|---|---|
| A. Fluorescence inhibition of *Salmonella enterica* pGFP in soft agar by PLAB | | | |
| 3H9 | 9,685 (907) | 38.4 | 0.002 |
| 14B4 | 7,885 (2,365) | 47.2 | 0.002 |
| PBS Control[1] | 372,100 (88,360) | NA | NA |
| B. Fluorescence inhibition of *Salmonella Typhimurium* pGFP in soft agar by PLAB | | | |
| 3H9 | 9,685 (907) | 38.4 | <0.002 |
| 14B4 | 7,885 (2,365) | 47.2 | <0.002 |
| PBS Control[1] | 372,100 (88,360) | NA | NA |

TABLE 1-continued

In vitro pathogen growth inhibition as measured by fluorescence

| Isolate | Avg. RFU[2] (St. Dev.) | Fold Difference | P value |
|---|---|---|---|
| C. Fluorescence inhibition of *Listeria monocytogenes* pGFP2 in soft agar by PLAB | | | |
| 3H9 | 5,760 (1,300) | 17.9 | <0.002 |
| 14B4 | 6,700 (1,340) | 15.4 | <0.002 |
| PBS Control | 103,200 (29,880) | NA | NA |
| D. Fluorescence inhibition of *Escherichia coli* O157:H7 pGFP in soft agar by PLAB | | | |
| 3H9 | 4,484 (1,006) | 54.3 | <0.002 |
| 14B4 | 4,928 (1,764) | 49.4 | <0.002 |
| PBS Control | 243,400 (82,210) | NA | NA |

Figure 2:
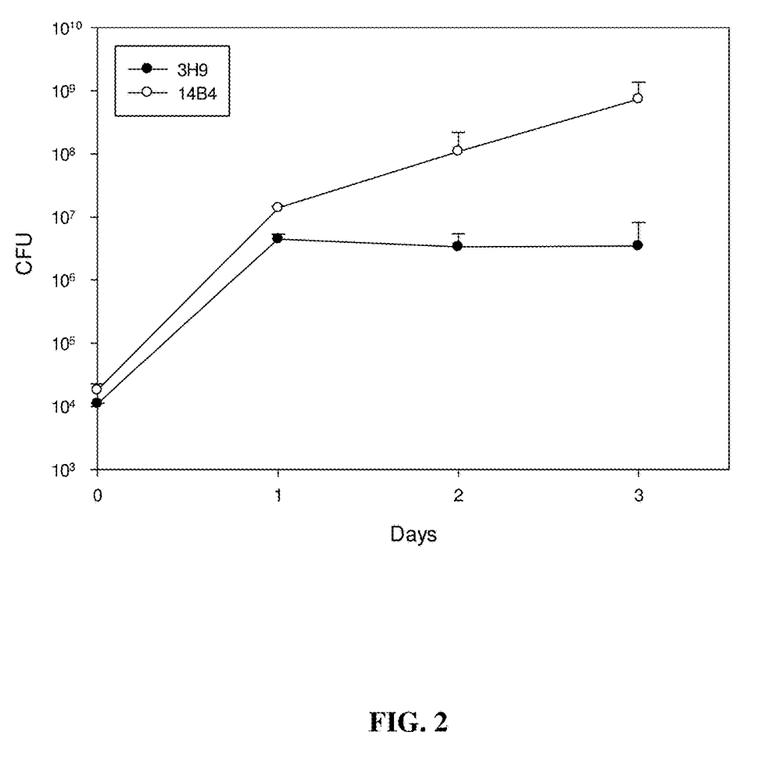
FIG. 2. Illustrates the ability of isolates 3H9 and 14B4 to grow and persist on the surfaces of cantaloupe melons at 25° C. Approximately $1 \times 10^4$ CFU of each isolate was inoculated onto the surfaces of cantaloupes and incubated them for 3 days at 25° C. The number of each isolate were quantitated on a daily basis. Isolate 3H9 was able to grow more than 2 logs and 14B4 by more than 4 logs over the experimental period; both isolates were able to persist until the end of the experiment. The experiment was terminated after three days due to rotting of the cantaloupe rind.
Figure 3:
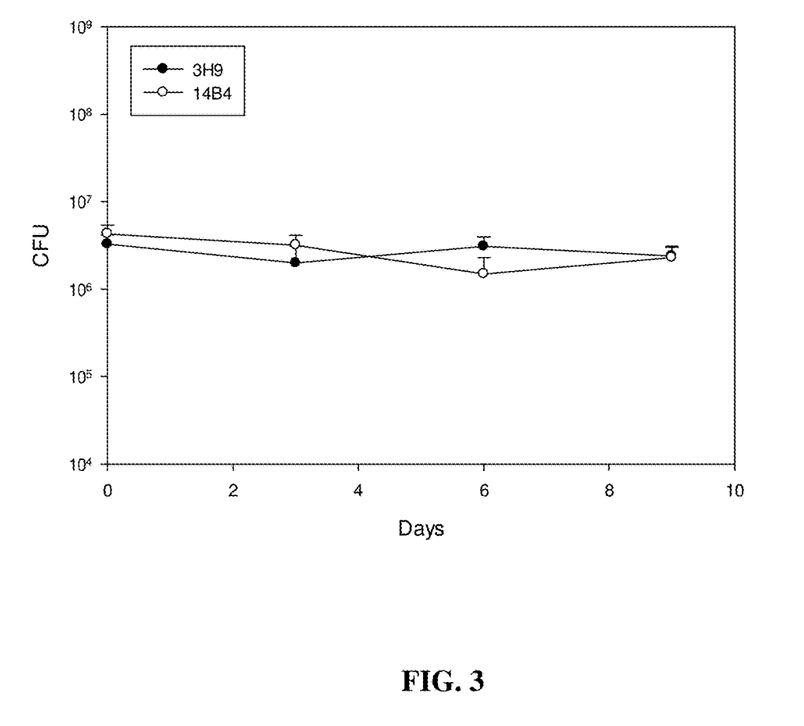

[1]PBS Control = phosphate buffered saline overlay
[2]RFU = relative fluorescent units Effective biocontrol agents must be able to grow and persist on the surfaces of the target plant so we examined the ability of isolates 3H9 and 14B4 to grown and persist on the surfaces of cantaloupe melons at 25° C. We inoculated approximately $1 \times 10^4$ CFU of each isolate onto the surfaces of cantaloupes and incubated them for 3 days at 25° C. We quantified the number of each isolate on a daily basis (FIG. 2) and observed that isolate 3H9 was able to grow more than 2 logs and 14B4 by more than 4 logs over the experimental period; both were able to persist until the end of the experiment. We terminated the experiment after 3 days due to the deterioration of the cantaloupe rinds (i.e. onset of rot). Because cantaloupes rot quickly post harvest at 25° C., producers keep them under refrigeration temperatures during storage. Thus, we determined the ability of the isolates to persist on the surfaces of the melons at 4° C. Cantaloupes were inoculated onto the surfaces of melons by placing them in a sterile plastic bag and pouring 400 ml of a 16 hr culture onto them. The air from the bags was removed so that the culture was in constant contact with the melons and incubated for one hour at 25° C. The melons were then patted dry with paper towels, air dried for 16 hr and a 5×5 cm sections were removed and quantified for the isolates (FIG. 3). Both isolates reached >$1 \times 10^6$ CFU on the 5×5 cm sections on day 0 and persisted above $1 \times 10^6$ throughout the 9 day experiment.

Figure 4:
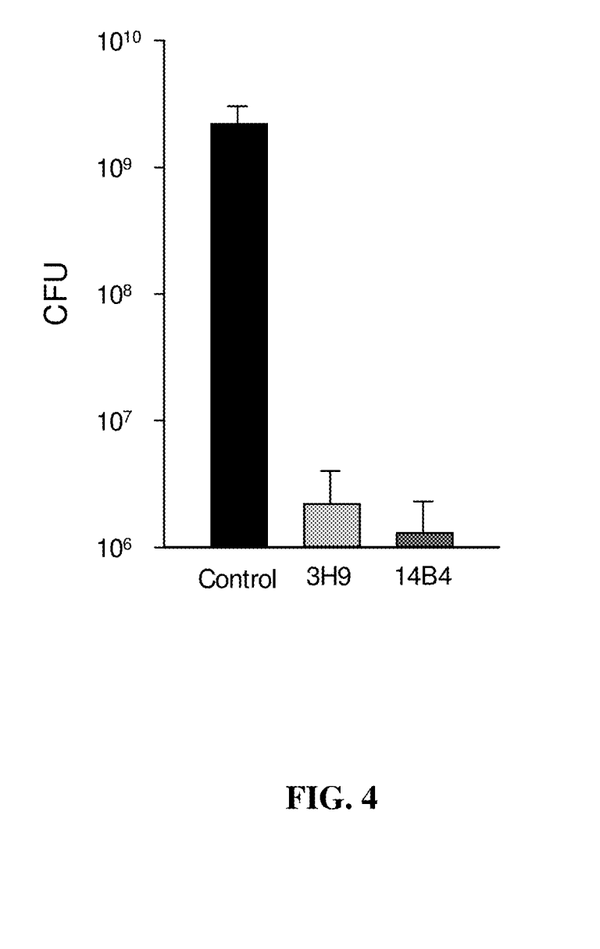

We examined the ability of our SSPLAB to reduce the growth of *Salmonella enterica* on cantaloupe rinds by applying the bacteria to the melons in sterile plastic bags as described above. We then removed 5×5 cm sections of the rind and place them in sterile petri plates. We inoculated each rind with approximately 200 CFU of *S. enterica*, incubated them for 24 hr at 25° C. and quantified them for *S. enterica* (FIG. 4). On the control rinds *S. enterica* reached over $2 \times 10^9$ CFU; while on the rinds treated with isolate 3H9 *S. enterica* only reached $2.2 \times 10^6$ CFU and on the rinds treated with 14B4 *S. enterica* only reached $1.3 \times 10^6$ CFU, representing approximately 1,000 and 1,700-fold reduction in growth, respectively.

In order to identify the PLAB isolates we sequenced the 16S rRNA gene and performed a BLAST analysis of the nearly full length sequences against the NCBI nucleotide collection (nr/nt) with the sequences limited to the type material (available at: http://blast.ncbi.nlm.nih.gov/Blast.cgi?PROGRAM=blastn&PAGE_TYPE=BlastSearch&LINK_LOC=blasthome). Our analysis showed that 3H9 was > 99% identical to *Enterococcus avium* (GenBank accession number NR_113899) and 14B4 was >99% identical to *Lactococcus lactis* (GenBank accession number NR_113958).

It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for controlling a human pathogen on the surface of a food product, the method comprising:
   a) applying a phyllosphere-associated lactic acid bacterium (PLAB) composition comprising a biologically pure bacterium selected from the group consisting of *Lactococcus lactis* PTA-122478, *Enterococcus avium* PTA-122479, and a combination thereof to the surface of the food product; and
   b) growing or storing the food product under conditions supporting the maintenance or growth of the PLAB culture, thereby controlling the human pathogen on the surface of the food product;
wherein the human pathogen is selected from the group consisting of *Salmonella, Listeria*, and *Escherichia*.

2. The method of claim 1, wherein the PLAB is applied at a concentration of $1\times10^4$ to $1\times10^8$ CFU per square inch of the surface of the food product.

3. The method of claim 2, wherein the PLAB is applied at a concentration $1\times10^5$ CFU per square inch of the surface of the fresh produce.

4. The method of claim 1, wherein the PLAB is *Lactococcus lactis* PTA-122478.

5. The method of claim 1, wherein the PLAB is *Enterococcus avium* PTA-122479.

6. The method of claim 1, wherein the human pathogen is *Salmonella enterica, Listeria monocytogenes*, or *Escherichia coli*.

7. The method of claim 1, wherein the PLAB is a mixture of *Lactococcus lactis* PTA-122478 and *Enterococcus avium* PTA-122479.

8. The method of claim 1, wherein the applying is carried out post-harvest and wherein the applying is by dipping the food product into a carrier comprising the PLAB.

9. The method of claim 8, wherein the PLAB is present in the carrier at a concentration of $1\times10^8$ to $1\times10^9$ CFU per mL of the carrier.

10. The method of claim 1, wherein the applying is carried out pre-harvest and the applying is by aerial spraying or sprinkling of a carrier comprising the PLAB.

11. The method of claim 10, wherein the PLAB is present in the carrier at a concentration of $1\times10^8$ to $1\times10^9$ CFU per mL of the carrier.

12. The method of claim 6, wherein the human pathogen is *Salmonella enterica* and growth of *Salmonella enterica* is reduced by at least about 10%.

13. A kit comprising a PLAB composition comprising a biologically pure bacterium selected from the group consisting of *Lactococcus lactis* PTA-122478, *Enterococcus avium* PTA-122479, or a combination thereof.

* * * * *